Aug. 11, 1936.     R. M. McMILLIN     2,050,723
SPLASH FEED
Filed June 2, 1934
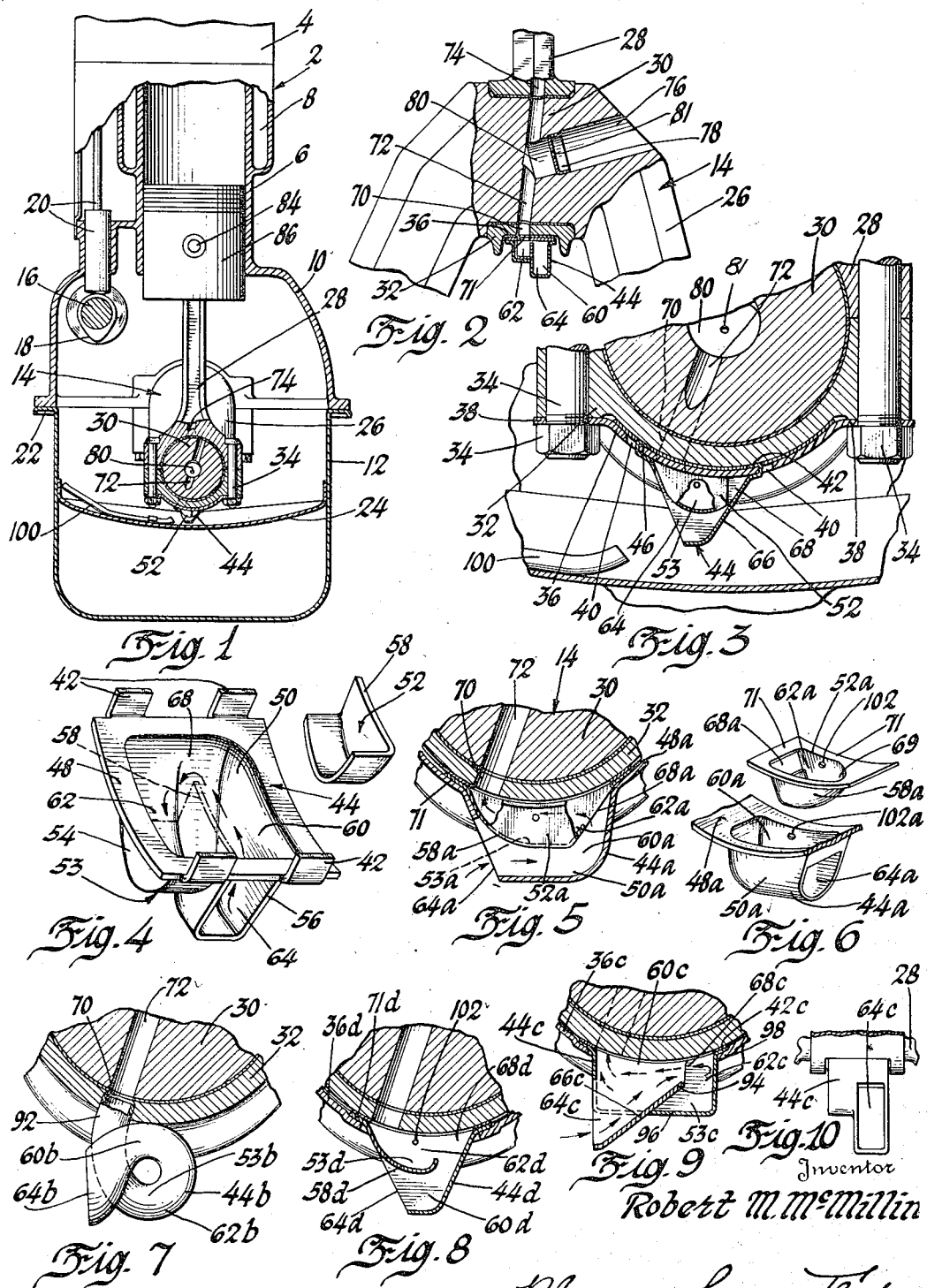
Inventor
Robert M. McMillin Patented Aug. 11, 1936

2,050,723

UNITED STATES PATENT OFFICE 2,050,723

SPLASH FEED

Robert M. McMillin, Detroit, Mich., assignor to General Motors Corporation, Detroit, Mich., a corporation of Delaware Application June 2, 1934, Serial No. 728,687

8 Claims. (Cl. 184—11)

This invention relates to lubricating systems and has particular reference to the lubrication of the crank pin bearing of the crank shafts of internal combustion engines.

In the prior art where a splash feed system has been used, the lubrication of the crank pin bearing has depended upon the oil which is scooped up by the dipper from troughs in the oil pan or in the crank case. The dipper at the downwardmost portion of the cycle of rotation of the crank shaft dipped into the oil and scooped up a portion thereof which was fed to the crank shaft bearing. Owing to the fact that the centrifugal force due to the rotation of the crank shaft is much greater than the force which pushes the oil to the bearing, the oil could no more than reach the surface of the bearing for a short period. This resulted in inadequate lubrication, and the dipper of the present invention is the outgrowth of experiments conducted to obtain better lubrication.

The dipper of the present invention is attached to the bottom of the connecting rod bearing and at the lowermost portion of the cycle of rotation of the crank shaft the dipper scoops up a quantity of oil and traps it. When the crank shaft throw has reached the uppermost portion of its cycle and starts to descend, the oil trapped in the dipper will be pulled into an opening in the crank shaft due to the centrifugal force which is now acting (relative to the dipper) in a direction opposite to that in which it was acting at the bottommost portion of the cycle. Accordingly there is a constant lubrication of the crank pin bearing by the oil which is delivered from the dipper into the crank pin at the uppermost portion of the stroke.

On the drawing—

Figure 1 is a sectional view through one cylinder of a multi-cylinder internal combustion engine showing the application of the invention.

Figure 2 is an enlarged sectional detail view showing the position of the parts immediately beyond the uppermost portion of the cycle of rotation of the crank shaft.

Figure 3 is a view of the parts at the lowermost position of the crank shaft or similar to that in Figure 1.

Figure 4 is a perspective view in disassembled relation of the dipper of the invention.

Figure 5 is a sectional view of a modification of the dipper.

Figure 6 is a perspective view of the structure of Figure 5.

Figures 7 and 8 are side and sectional views respectively of further modifications.

Figures 9 and 10 are views corresponding to Figures 5 and 6 of a further modification of the dipper.

Referring to the drawing, the numeral 2 indicates an internal combustion engine having the cylinder head 4, the engine block 6, the water cooling system 8, crank case 10, and oil pan 12. The usual crank shaft is indicated at 14 and cam shaft at 16. The cam shaft has the cams 18 which operate the push rods 20 to operate the valves of the engine. The oil pan is secured to the crank case at 22 and has mounted therein the troughs 24, there being one trough for each throw 26 of the crank shaft, or one for each connecting rod 28. The connecting rod 28 is secured to the crank pin bearing 30 of the crank shaft by means of the bearing cap 32 and the bolts and nuts 34. The parts so far described are conventional, and per se form no part of the invention.

Secured to the bottom or lower side of the cap 32 of the connecting rod is the member 36 the ends of which form washers 38 for the nuts 34. The member 36 is provided with the openings 40 adapted to receive the tongues 42 of the dipper indicated as a whole at 44. The tongues 42 are bent over as shown at 46 and the sides 48 of the dipper spot welded in place after the tongues 42 have been bent as shown in Figure 3. This structure rigidly secures the dipper to the bottom of the bearing cap 32.

The dipper 44 is preferably formed by suitably stamping a sheet of thin metal and comprises the main portion 50 and the secondary portion 52 having a rounded bottom forming a well or trap 53. The secondary member 52 is set inside the main member 50 as shown by the dotted outline in Figure 4. The member 52 is welded to the member 50 in final assembly.

Referring to the perspective view in Figure 4, it will be noted that the dipper comprises the end walls 54 and 56 and the intermediate wall 58 formed on the secondary member 52. This intermediate wall 58 divides the dipper into two compartments 60 and 62. The compartment 60 has the mouth or open ended portion 64 which is adapted to dip into the trough 24 when the throw 26 of the crank shaft is in its lowermost position as shown in Figure 3, and to scoop up the oil as the shaft rotates. The oil will be forced up the inclined portion 66 at the back of the dipper and will be forced through the passage 68 formed by cutting away a portion of the wall 58 of the secondary member 52. After the oil is forced through the passage 68 and into the compartment 62, the oil will be trapped in the well 53 and its return from the mouth 64 prevented.

Referring to Figure 2, attention is called to the fact that the bearing cap has a lubricant opening 70, the member 36 has a mating opening 71, the crank pin 30 has a lubricant passage 72, while the connecting rod has an inclined lubricant passage 74. The crank pin is bored as indicated at 76 and a plug 78 inserted to form an oil reservoir at 80. The plug 78 is provided with a small vent opening 81 at its center. When the crank throw is at the lowermost portion of the stroke as shown in Figure 3, the passage 72 in the crank shaft will not mate with the passage 70 in the cap because the passage is at an angle. In the position shown in Figure 3, the upper end of the passage 72 in Figure 2 will be at the bottom of the throw. The only oil which will reach the bearing of the pin 30 from the dipper at the bottom of the cycle of rotation will be the small quantity which will lubricate the surface through the opening 70. As the crank shaft reaches the top of its throw and begins to descend, the passage 72 will be in alignment with the opening 70 in the bearing cap and with the passage 74 in the connecting rod. Owing to the fact that the crank shaft is now moving downwardly, the inertia of the body of oil caused by the upward movement of the throw will cause the oil trapped in the compartment 62 to move up toward the opening 70 and the centrifugal force which is now acting with the body of oil through the passage 72 will pull the oil into the passage 72 and reservoir 80 so that it will be available after the end of the passage 72 leaves the passage 70 to lubricate the crank pin bearing from the end of the passage 72 at the upper portion of Figure 2.

While the parts are in the position shown in Figure 2, the centrifugal force will cause a shot of oil from the reservoir 80 and passage 72 to pass into the passage 74 of the connecting rod. For each revolution of the crank shaft there will be a shot of oil passed to the connecting rod. This shot of oil will be passed to the bearing of the wrist pin 84 on which the piston 86 is mounted. The manner of lubricating the wrist pin bearing and the crank shaft bearing is the joint invention of Alex Taub and myself and is described and claimed in copending application Serial No. 728,688 filed June 2, 1934. The present application covers the dipper per se.

Referring to Figures 5 and 6, a modified form 44a of the dipper is shown. The dipper has the mouth portion 64a in the main portion 50a, and the intermediate wall 58a formed on the secondary member 52a. The two compartments are indicated at 60a and 62a. The oil is trapped in the compartment 62a and is held in the reservoir indicated by the numeral 53a. The passage between the compartments 60a and 62a is indicated at 68a. The dipper 44a is secured to the cap 32 by making the main portion 50a integral with the member 36. The secondary member 52a has the end 69 of the compartment nearest the opening 70 so pointed or formed that the momentum of the body of the oil will direct it to the opening. In other words, the tip of the end 69 is under the opening 70 so that when the momentum of the body of oil forces the oil toward the end 69, the shape of the end will force the oil under the opening 70. Flanges 71 on the secondary member 52a rest on flanges 48a on the main portion 50a.

Referring to Figure 7, the dipper 44b is in the form of a spiral. The mouth is indicated at 64b, the two compartments at 60b and 62b. The oil is trapped in the portion of the dipper indicated by the numeral 53b. The dipper 44b is secured to the cap 32 by inserting the dipper end 92 into the opening 70 and suitably securing the parts as by welding or by a press fit.

Referring to Figure 8, a further modified form 44d of the dipper is shown. The dipper is made of one piece and has the mouth 64d and the intermediate wall 58d formed by bending inwardly one wall to form the mouth 64d. The two compartments are indicated at 60d and 62d. The oil is trapped in the compartment 62d and is held in the reservoir indicated by the numeral 53d. The passage between the compartments 60d and 62d is indicated at 68d. The dipper 44d is secured to the member 36d by providing an opening in the member and seating the flanges 71d at the edge of the opening. The flanges 71d may be welded or otherwise secured to the edges of the opening in the member 36d.

In Figure 9 the dipper 44c includes the mouth 64c, the compartments 60c and 62c, the passage 68c, the inclined portion 66c. The direction the oil takes in passing from the compartment 60c to the compartment 62c is indicated by the arrows. The full line arrows indicate the passage of the oil up the inclined portion and through the passage 68c. The dotted lines indicate the oil which has been trapped in the trap 53c in the compartment 62c. It will be noted that the upper portion 94 of the inclined portion 66c is considerably above the bottom 96 of the compartment 62c. This will prevent the return flow of oil which has passed the top 94 and passed into the compartment 62c.

The dipper 44c is secured to the member 36c by means of the tongues 42c which are passed underneath the edges 98 of a cut out portion in the member 36c.

Referring to Figures 1 and 3, it will be noted that a suitable system of piping 100 is provided which comes from the usual oil pump (not shown). The purpose of the piping is to force a stream of oil into the path of the dipper 44 as it reaches the bottom of the turning movement of the crank shaft. By referring to Figure 3, it will be seen that the exit of the pipe 100 will shoot the oil directly into the mouth 64 of the dipper 44. This will insure an adequate supply of lubricant in the dipper 44 at all times.

The plug 78 is provided with the vent 81 to prevent air from being trapped in the passage 72 and reservoir 80. The dippers 44, 44a, 44b, 44c, and 44d are also preferably provided with a vent in the compartment 62, 62a, 62b, or 62c for the same reason. The vent may be applied at any suitable point as shown at 102a and 102 in Figures 6 and 8 respectively.

I claim:

1. In a means for lubricating the connecting rod bearing of the crank shaft of an internal combustion engine having an oil pan, a dipper attached to the connecting rod bearing, said dipper being divided into a plurality of compartments each extending the full length of the dipper, one compartment adapted to scoop up oil and throw the oil into the second compartment, said second compartment trapping a quantity of the oil.

2. In a means for lubricating the connecting rod bearing of the crank shaft of an internal combustion engine having an oil pan, a dipper attached to the connecting rod bearing cap, said dipper being divided into two compartments each extending the full length of the dipper, one compartment adapted to dip into the oil and scoop up the oil and force it into the second compartment, and a wall between said compartments preventing the return of a quantity of the oil from the second compartment.

3. In a means for lubricating the connecting rod bearing of the crank shaft of an internal combustion engine having an oil pan, a dipper attached to the connecting rod bearing, a wall dividing said dipper into two side-by-side compartments, each extending the full length of the dipper, one of said compartments being open at its end to adapt it to scoop up oil from the oil pan and throw it into the second compartment, said second compartment and wall trapping a quantity of the oil.

4. In a dipper for attachment to the connecting rod of an engine, two parallel side by side compartments whose longitudinal axes lie in planes parallel to the longitudinal axis of the connecting rod, a short wall between the two compartments and an opening in the face of one acting to scoop up oil, the force of which causes it to pass into the compartments and over the wall into the second compartment where it is trapped.

5. In a dipper for attachment to the connecting rod of an engine, end walls and an intermediate wall, said intermediate wall dividing the dipper into two longitudinal compartments, said intermediate wall not entirely extending across the opening between the two compartments to form an oil passage, one of said compartments having a mouth to enable the dipper to scoop up oil as the connecting rod moves, said oil passing through said passage into the other compartment and being trapped therein.

6. An accessory lubricating attachment for connecting rod bearings comprising a metal stamping having a flanged surrounding edge shaped to conform to the outer face of the bearing, a plurality of ears depending from the flange by which the stamping is secured to the face of the bearing, and a plurality of compartments for scooping and trapping oil.

7. In a dipper for attachment to the connecting rod of an engine, two parallel compartments in the dipper, one of which has an opening adapted to scoop up oil, a wall between the two compartments but not extending entirely across the opening to leave an oil flow passage whereby when oil is scooped up by one compartment it is thrown through the passage into the second and trapped.

8. In a dipper for attachment to the connecting rod of an engine, two longitudinal compartments side by side, a wall partially closing the space between the compartments, an opening in one of the compartments adapted to scoop up oil whereby when oil is forced into the first compartment it is forced transversely over the wall into the second compartment and trapped.

ROBERT M. McMILLIN.